(12) United States Patent
Aaron

(10) Patent No.: US 8,095,974 B2
(45) Date of Patent: Jan. 10, 2012

(54) METHODS, SYSTEMS, AND PRODUCTS FOR IDENTITY VERIFICATION

(75) Inventor: Jeffrey A. Aaron, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 888 days.

(21) Appl. No.: 11/710,285

(22) Filed: Feb. 23, 2007

(65) Prior Publication Data

US 2008/0209543 A1 Aug. 28, 2008

(51) Int. Cl.
*G06F 21/00* (2006.01)

(52) U.S. Cl. .......................................... 726/17; 235/380

(58) Field of Classification Search .................... None
See application file for complete search history.

(56) References Cited

U.S. PATENT DOCUMENTS

| | | | |
|---|---|---|---|
| 5,572,221 A | 11/1996 | Marlevi et al. | |
| 7,019,650 B2 | 3/2006 | Volpi et al. | |
| 7,097,106 B2 | 8/2006 | Silverbrook et al. | |
| 7,131,575 B1 * | 11/2006 | Kolls | 235/379 |
| 2002/0165758 A1 * | 11/2002 | Hind et al. | 705/10 |
| 2003/0055785 A1 * | 3/2003 | Lahiri | 705/41 |
| 2003/0151524 A1 | 8/2003 | Clark | |
| 2004/0085192 A1 | 5/2004 | Hartmann | |
| 2006/0020459 A1 | 1/2006 | Carter et al. | |
| 2006/0137154 A1 | 6/2006 | Bills | |
| 2006/0145812 A1 | 7/2006 | Sajkowsky | |
| 2006/0187044 A1 | 8/2006 | Fabian et al. | |
| 2006/0202827 A1 | 9/2006 | Volpi et al. | |
| 2006/0208857 A1 | 9/2006 | Wong | |
| 2006/0237546 A1 | 10/2006 | Lapstun et al. | |
| 2007/0082706 A1 | 4/2007 | Campbell et al. | |
| 2007/0087834 A1 * | 4/2007 | Moser et al. | 463/42 |
| 2007/0208861 A1 | 9/2007 | Zellner et al. | |
| 2007/0268138 A1 | 11/2007 | Chung et al. | |
| 2008/0032719 A1 | 2/2008 | Rosenberg | |
| 2008/0157966 A1 | 7/2008 | Danvir et al. | |

* cited by examiner

*Primary Examiner* — Gilberto Barron, Jr.
*Assistant Examiner* — Simon Kanaan
(74) *Attorney, Agent, or Firm* — Scott P. Zimmerman PLLC

(57) ABSTRACT

Methods, systems, and products are disclosed for identification verification. A signature, representing the presence of a device, is acquired. The signature is compared to a reference signature. When the signature favorably compares to the reference signature, then the identity of a user associated with the device is verified.

20 Claims, 14 Drawing Sheets

METHODS, SYSTEMS, AND PRODUCTS FOR IDENTITY VERIFICATION

COPYRIGHT NOTIFICATION

A portion of the disclosure of this patent document and its attachments contain material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

BACKGROUND

The exemplary embodiments generally relate to communications and to data processing and, more particularly, to security and to location monitoring.

Identity theft is a problem. Each year identity fraud costs consumers and merchants billions of dollars. Conventional schemes to verify identity require knowledge information (e.g., usernames and passwords), physical attributes (e.g., fingerprint match, retina match, or other biometric measures), or physical possession (e.g., car keys). These three conventional approaches are well known and are commonly referred to as verification using "what you know," "what you are," and "what you have." Because identity theft is, unfortunately, almost routinely common, additional measures of identity could be enormously beneficial. What is needed, then, are methods, systems, and products that describe a new paradigm in identity verification.

SUMMARY

The exemplary embodiments provide methods, systems, and products for verifying a user's identity. Exemplary embodiments utilize a constellation of transponders to verify a user's identity. That is, exemplary embodiments may verify the user's identity based on unique identification numbers received from one or more transponders (or "tags"). As transponder technology becomes less expensive, industry experts predict that everyday articles will include transponders. Each transponder may uniquely identify itself, and thus the article, to which it is attached. Exemplary embodiments interrogate the transponders to obtain their identification numbers. Exemplary embodiments then use those unique identification numbers to verify identity. If the identification numbers are recognized, then the user is wearing, holding, or possessing recognized articles, so the identity of the user may be verified. If, however, some or all of the identification numbers are not recognized, then the identity of the user cannot be verified. So when exemplary embodiments recognize a wallet, car keys, and wedding ring, this combination (or "constellation") of identification numbers may be used to verify the user's identity. Exemplary embodiments thus authenticate users based on their constellation of articles. Exemplary embodiments, at least some respects, may be referred to as utilizing/recognizing "a set of what you have," "potential sets of what you would likely have," and/or "more of what you have," where "what you have" may alternately or additionally mean "what you own" and/or "what would be associated with you."

Exemplary embodiments include a method for identification verification. A signature, representing the presence of a device, is acquired. The signature is compared to a reference signature. When the signature favorably compares to the reference signature, then the identity of a user of the device is verified.

More exemplary embodiments include a system for verifying a user's identity. A signature, representing the presence of a device, is acquired. The signature is compared to a reference signature. When the signature favorably compares to the reference signature, then the identity of a user of the device is verified.

Other exemplary embodiments describe a computer program product for verifying a user's identity. A signature, representing the presence of a device, is acquired. The signature is compared to a reference signature. When the signature favorably compares to the reference signature, then the identity of a user of the device is verified.

Other systems, methods, and/or computer program products according to the exemplary embodiments will be or become apparent to one with ordinary skill in the art upon review of the following drawings and detailed description. It is intended that all such additional systems, methods, and/or computer program products be included within this description, be within the scope of the claims, and be protected by the accompanying claims.

BRIEF DESCRIPTION OF THE SEVERAL VIEWS OF THE DRAWINGS

These and other features, aspects, and advantages of the exemplary embodiments are better understood when the following Detailed Description is read with reference to the accompanying drawings, wherein.

DETAILED DESCRIPTION

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the exemplary embodiments to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Those of ordinary skill in the art further understand that the exemplary hardware, software, processes, methods, and/or operating systems described herein are for illustrative purposes and, thus, are not intended to be limited to any particular named manufacturer.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first device could be termed a second device, and, similarly, a second device could be termed a first device without departing from the teachings of the disclosure.

Figure 1:
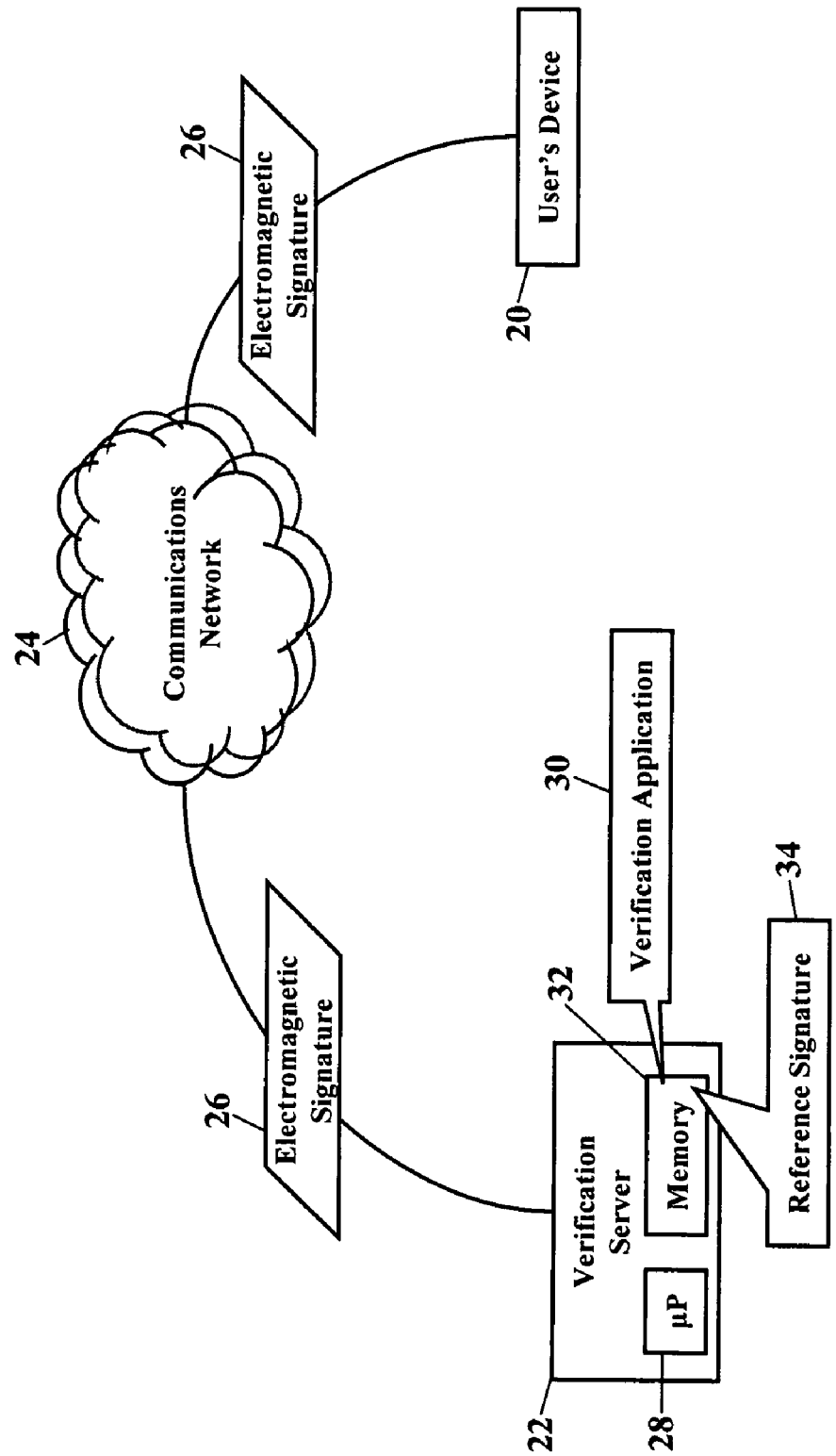
FIG. 1 is a schematic illustrating an operating environment in which exemplary embodiments may be implemented.

FIG. 1 is a schematic illustrating an environment in which exemplary embodiments may be implemented. A user's device 20 communicates with a verification server 22 via a communications network 24. Although the user's device 20 is generically shown, the device 20, as will be later explained, may be a computer, a radio, a personal digital assistant (PDA), a cordless/cellular/IP phone, digital music player, or any other processor-controlled device. Whatever the user's device 20, the user's device 20 communicates a signature 26 to the verification server 22, according to exemplary embodiments. The signature 26 may be any electromagnetic signal or wave that uniquely identifies the user's device 20. The signature 26, for example, may have a unique voltage pattern, current pattern, electromagnetic power or pattern of power measurements, phase or pattern of phases, information or content, or any other component or value that may uniquely identify the user's device 20.

When the verification server 22 receives the signature 26, exemplary embodiments verify the identity of the user based on the signature 26. The verification server 22 has a processor 28 (e.g., "µP"), application specific integrated circuit (ASIC), or other similar device that executes a verification application 30 stored in memory 32. According to exemplary embodiments, the verification application 30 is a set of processor-executable instructions that verify the identity of the user associated with the device 20, based on a reference signature 34. As FIG. 1 illustrates, the reference signature 34 may be stored in the memory 32 of the verification server 22, yet the reference signature 34 may be remotely accessed via the communications network 24. The reference signature 34 represents one or more signatures that have been previously received from, and/or historically observed from, the user's device 20.

The identity of the user may be verified using the signature 26. The verification application 30 compares the signature 26 to the reference signature 34. When the signature 26 favorably compares to the reference signature 34, then the verification application 30 may verify the identity of the user associated with the device 20. Because the signature 26 matches, or nearly matches, the reference signature 34, the verification application 30 may assume that the user is the person that is historically associated with the device 20. That is, the device 20 is not sending a new or unrecognized signature 26. When, however, the signature 26 unfavorably compares to the reference signature 34, then the verification application 30 may (or may not) decline to verify the identity of the user. If the signature 26 is not recognized, or if the signature 26 varies too much from the reference signature 34, then the verification application 30 may be configured to decline verification of the user.

Exemplary embodiments, then, verify a user's identity based on signatures. Many devices have a unique electromagnetic signature. When that unique signature is observed, there may be a higher probability that the current user is the same historical user, and so the identity of the current user may be verified. Conversely, when the signature 26 unfavorably compares to the reference signature 34, then exemplary embodiments may decline to verify the identity of the user associated with the device 20. The device 20 is not sending a historically-observed signature, so the identity of the current user may or may not match the historical user. As later paragraphs will explain, the verification application 30 may be completely configured to determine favorable and unfavorable comparisons.

The verification server 22 is only simply illustrated. Because the verification server's architecture and operating principles are well known, its hardware and software components are not further shown and described. If the reader desires more details, the reader is invited to consult the following sources, all incorporated herein by reference in their entirety: ANDREW TANENBAUM, COMPUTER NETWORKS ($4^{th}$ edition 2003); WILLIAM STALLINGS, COMPUTER ORGANIZATION AND ARCHITECTURE: DESIGNING FOR PERFORMANCE ($7^{th}$ Ed., 2005); and DAVID A. PATTERSON & JOHN L. HENNESSY, COMPUTER ORGANIZATION AND DESIGN: THE HARDWARE/SOFTWARE INTERFACE ($3^{rd}$. Edition 2004).

Exemplary embodiments may be applied regardless of networking environment. The communications network 24 may be a cable network operating in the radio-frequency domain and/or the Internet Protocol (IP) domain. The communications network 24, however, may also include a distributed computing network, such as the Internet (sometimes alternatively known as the "World Wide Web"), an intranet, a local-area network (LAN), and/or a wide-area network (WAN). The communications network 24 may include coaxial cables, copper wires, fiber optic lines, and/or hybrid-coaxial lines. The communications network 24 may even include wireless portions utilizing any portion of the electromagnetic spectrum and any signaling standard (such as the I.E.E.E. 802 family of standards, GSM/CDMA/TDMA or any cellular standard, and/or the ISM band). The concepts described herein may be applied to any wireless/wireline communications network, regardless of physical componentry, physical configuration, or communications standard(s).

Figure 2:
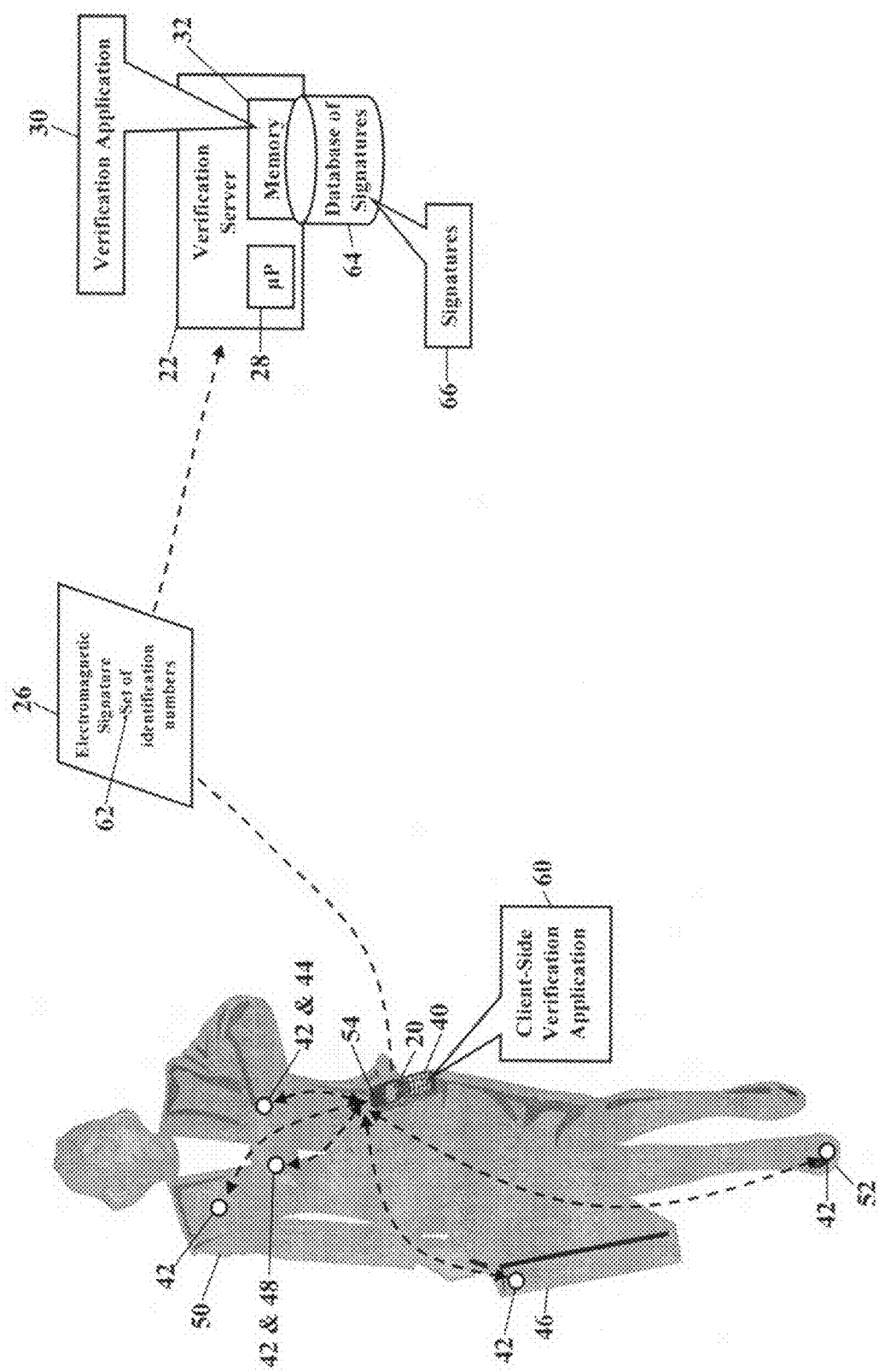
FIG. 2 is a schematic illustrating a constellation of transponders that verify a user's identity, according to more exemplary embodiments.

FIG. 2 is a schematic illustrating a constellation of transponders that verify a user's identity, according to more exemplary embodiments. Here the user is illustrated as a businesswoman, and the user's device 20 is illustrated as a wireless phone 40 worn around the user's waist (the wireless phone 40 is enlarged for clarity). The user's identity is verified using a constellation of multiple transponders 42. The user's device 20 wirelessly communicates with the transponders 42. Each transponder 42 may be associated with some personal asset or article, such as a watch 44, a briefcase 46, a ring 48, or even clothing (e.g., a jacket 50 and a shoe 52). Some industry experts predict that many everyday articles will eventually include a transponder. Rings, watches, keys, clothing, and any other articles will include a transponder that uniquely identifies the article. As those of ordinary skill in the art understand, when the user's wireless phone 40 interrogates the transponders 42, each transponder 42 may respond by sending its associated identification number that uniquely identifies the presence of the transponder 42. The transponders 42, for example, may be radio frequency identification ("RFID") "tags" that respond to an RFID reader 54 operating in the user's device 20 (e.g., the wireless phone 40). The transponders 42, in general, though, may operate at any frequency of the electromagnetic spectrum and may utilize any suitable communication, transmission, modulation, and/or encoding methods. Furthermore, the term "transponder," as used herein, may include devices which proactively, periodically, and/or randomly transmit signal signatures, rather than just responding when queried or interrogated.

Exemplary embodiments use the unique identification numbers (associated with the transponders 42) to verify identity. If the identification numbers are recognized, then the user is wearing, holding, or possessing recognized articles, so the identity of the user may be verified. If, however, the identification numbers are not recognized, then perhaps an imposter or thief has acquired the wireless phone 40. Because many items may soon include RFID devices, these devices may be queried for their unique identifiers. Exemplary embodiments thus authenticate users based on one or more identifiers from these RFID devices. A thief may steal the user's credit card, but the thief is unlikely to have stolen the user's clothing, much less a combined ensemble that the user normally wears. The thief, for example, is unlikely to simultaneously possess the user's wallet, car keys, watch, eyeglasses, and wedding ring, so this combination (or "constellation") of identification numbers may be used to verify identity. When exemplary embodiments observe the identification numbers corresponding to the user's wallet, car keys, watch, eyeglasses, and wedding ring, exemplary embodiments may be permitted to verify the user's identity.

The user's device 20 receives the responses. The user's device 20 executes a client-side verification application 60 that is stored in memory (not shown for simplicity). According to exemplary embodiments, the client-side verification application 60 is a set of processor-executable instructions that cooperate with the verification application 30 (in the verification server 22) to verify the identity of the user associated with the device 20. The client-side verification application 60 may then instruct its host processor to extract and to collect each transponder's unique transmitted signal and/or identification number. The client-side verification application 60 may then instruct the host processor to assemble the multiple unique identification numbers (and any other pertinent signal-related information) into the signature 26. According to exemplary embodiments, the signature 26 thus comprises a listing or set 62 of the unique identification numbers (and/or signal characteristics and/or other data and/or parameters) representing the constellation of transponders 42 currently associated with the user of the wireless phone 40. The listing or set 62 thus describes some or all of the personal assets or articles worn by, or associated with, the current user of the wireless phone 40. Note that one or more signal characteristics (associated with the transponders 42) might be unique or be purposely made unique, and so could be used in lieu of or in addition to an identification number and/or other communicated data in order to uniquely designate a particular item. Signal characteristics may include time periods, time intervals, frequencies, frequency offset and/or frequency differences, modulation parameters, spread spectrum codes, phase values, changes, and/or differences, and time-related behavior such as repeat patterns. The term "signature," as used herein, may include the composite of multiple received communications or signals, and thus includes the actual signals, signal characteristics, and/or data transmitted by one or more transponders and/or at any given moment.

Exemplary embodiments verify the identity of the user based on the signature 26. The client-side verification application 60 instructs the host processor to send the signature 26 to the verification server 22. When the verification server 22 receives the signature 26, the server-side verification application 30 instructs the processor 28 to query a database 64 of signatures for the signature 26. That is, the verification application 30 queries to determine whether the currently-received listing or set 62 of unique identification numbers is found or matched in the database 64 of signatures. According to exemplary embodiments, the database 64 of signatures stores signatures 66 that have been historically received from the user's wireless phone 40. Each signature 66 may comprise one or more reference transponder identification numbers that have been historically received from the wireless phone 40 (and/or from any devices associated with the same user or users). If the signature 26 is matched in the database 64 of signatures, then the listing or set 62 of unique identification numbers has been historically observed and/or saved in the database 64. When the signature 26 favorably compares to the historical signature 66, then the verification application 30 may verify the identity of the user of the wireless phone 40. Because the user's current constellation of articles matches what has been historically observed, the verification application 30 may assume that the user is the historical user of the wireless phone 40. That is, the user is currently carrying, wearing, or associated with the same watch, wallet, keys, and other personal articles that have been historically observed. Because the current signature 26 matches historical data, there is a higher probability that the current user is the same person that accumulated the historical signature 66 in the database 64 of signatures. When, however, the signature 26 unfavorably compares to the database 64 of signatures, then the verification application 30 may decline to verify the identity of the user. If the signature 26 is not recognized, or if the signature 26 varies too much from the signatures 66 in the database 64 of signatures, then the verification application 30 may be configured to decline verification of the user.

Exemplary embodiments may encompass at least two types of signatures or constellations. A first type of signature is that which has been historically observed. A second type of signature is that which may be theoretically encounterable or inferred at some point in the future. The second type of signature, for example, may be a combination or permutation of individual signature items which, individually, have been historically encountered (e.g., individually registered) and/or are otherwise somehow verifiably associated with a user. For the second type of signature or constellation, a higher probability of identity verification occurs with an increased number of valid items detected and/or with an increased similarity or overlap with constellations of the first type.

Exemplary embodiments may utilize any type of transponder. The user's device 20 may inductively or propagatively couple with any transponder design or fabrication. According to exemplary embodiments, the transponder 42 is any transmitter or responder (hence the term "transponder") that responds to an emitted interrogation field or wave. The transponder 42, for example, may be a passive or active tag that is fabricated using integrated circuits, coils, and/or "coil-on-chip" technology. Transponders, however, are well-known to those of ordinary skill in the art, so the intricate details of transponder componentry and/or circuitry are not repeated here.

Figure 3:
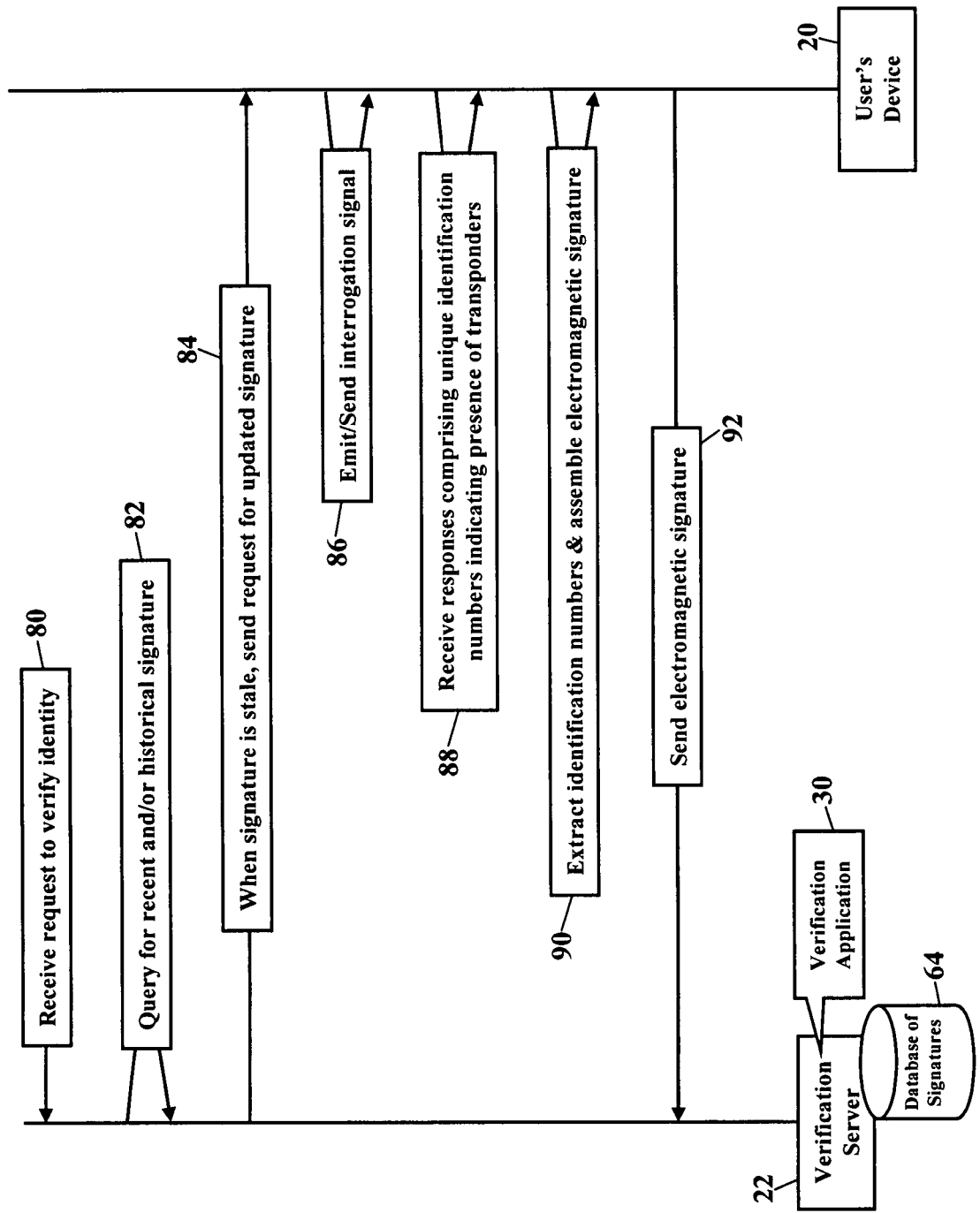
FIGS. 3 and 4 are schematics illustrating a process of verifying a user's identity, according to still more exemplary embodiments.
Figure 4:
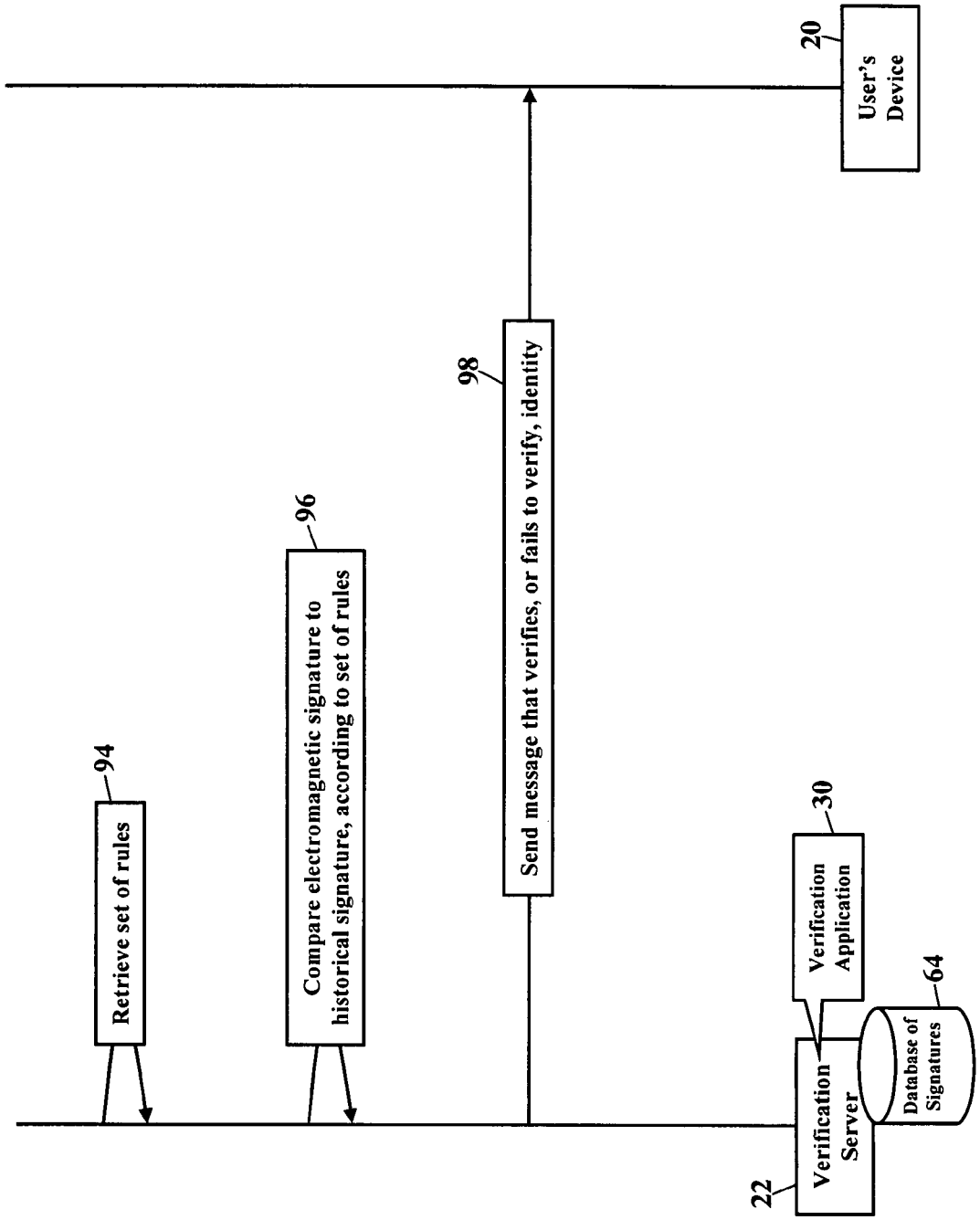

FIGS. 3 and 4 are schematics illustrating a process of verifying a user's identity, according to still more exemplary embodiments. Here the verification application 30 may access rules that determine how strictly the signature is compared to historical signatures. The verification server 22 may first receive a request to verify an identity (Step 80). The request may originate from any person, such as a third party restaurant or business that wishes to verify the user of the device 20. When the verification server 22 receives the request, the verification application 30 may query for a recent signature (Step 82). When the most recent signature is stale (that is, older than some predetermined time), the verification application 30 may send a request for an updated signature (Step 84). When the device 20 receives the request, the client-side verification application 60 causes an interrogation signal to be sent (Step 86). Responses are received that comprise unique identification numbers indicating the presence of one or more transponders (Step 88). Each transponder's unique identification number may be extracted and assembled into a signature (Step 90). The signature may thus comprise the listing or set (shown as reference numeral 62 in FIG. 2) of the unique identification numbers representing the constellation of transponders currently associated with the user's device 20. The signature is sent to the verification server 22 (Step 92).

The process continues with FIG. 4. When the verification server 22 receives the electromagnetic signature, the verification application 30 may retrieve a set of rules (illustrated as reference numeral 72 in FIG. 7) (Step 94). The signature is compared to one or more historical signatures, according to the set of rules (Step 96). The set of rules determines how strictly, or how leniently, the signature is compared to historical signatures. The verification application 30 may then send a message that verifies, or fails to verify, the identity of the user (Step 98).

The set of rules defines how the signature is compared to the historical signatures. The set of rules may be stored in the memory of the verification server 22, yet the set of rules may be remotely accessed (via the communications network 24 shown in FIG. 1). The set of rules may also be supplied by the verification requestor (e.g., attached to or specified by the verification request illustrated as Step 80 in FIG. 3). The set of rules is associated with the device 20 and retrieved/applied when verification is desired. The set of rules, for example, may establish a logical comparison of signatures, according to date and/or time. The set of rules, for example, may strictly require a perfect match between the signature and a historical signature. That is, the set of rules may require that the set of unique identification numbers (representing the constellation of transponders currently associated with the user's device 20) must exactly match a listing in some historical signature. According to such a strict set of rules, no variation is permitted, so each transponder's unique identification number must be found in the historical signature.

A more lenient set of rules may permit variation in the comparison. The set of rules, for example, may only require a ninety percent (90%) match. That is, only 90% of the listing of unique identification numbers (representing the constellation of transponders currently associated with the user's device 20) must match a listing in some historical signature. If the listing includes ten unique identification numbers, then the set of rules may only require nine matches in some historical signature. A twenty percent (20%) threshold would only leniently require two matches in some historical signature. The stricter the rules, then the greater the chances of a failed verification.

The set of rules may also have membership requirements. The set of rules may specify that one or more unique identification numbers must be present in the electromagnetic signature. The set of unique identification numbers (representing the constellation of transponders currently associated with the user's device 20), in other words, must have certain members or else verification may be denied. The set of rules, for example, may require that a unique identification number associated with a wallet must be present in order to permit verification of identity. When the wallet's unique identification number is missing from the signature, then verification is denied. The set of rules may require the presence of multiple identification numbers, such as those corresponding to a wallet, car keys, and a belt. The set of rules may be configured or defined with any membership requirement to affect the desired level of personal security.

The set of rules may also include time and date requirements. The set of rules may require that the verification application 30 compare signatures according to time and/or date. The set of rules, for example, may specify membership sets for particular times or dates. During work hours, for example, the set of rules may be configured to always require identification numbers representing work-related articles, such as work shoes, an employment badge, and perhaps a lunchbox and/or briefcase. If those associated identification numbers are not observed during work hours, then the verification application 30 may or may not deny verification of the user's identity. The set of rules may specify one or more valid reference signatures for Monday through Friday and one or more different, valid reference signatures for the weekends. If the day is Saturday and the current signature does not match at least one of the weekend reference signatures, then verification is denied. The set of rules may require that the current signature is only compared, or is preferably compared, with the previous two weeks of historical signatures. The set of rules, in short, may specify any intervals of time by date(s) for which signatures are compared and/or are preferably compared.

Figure 5:
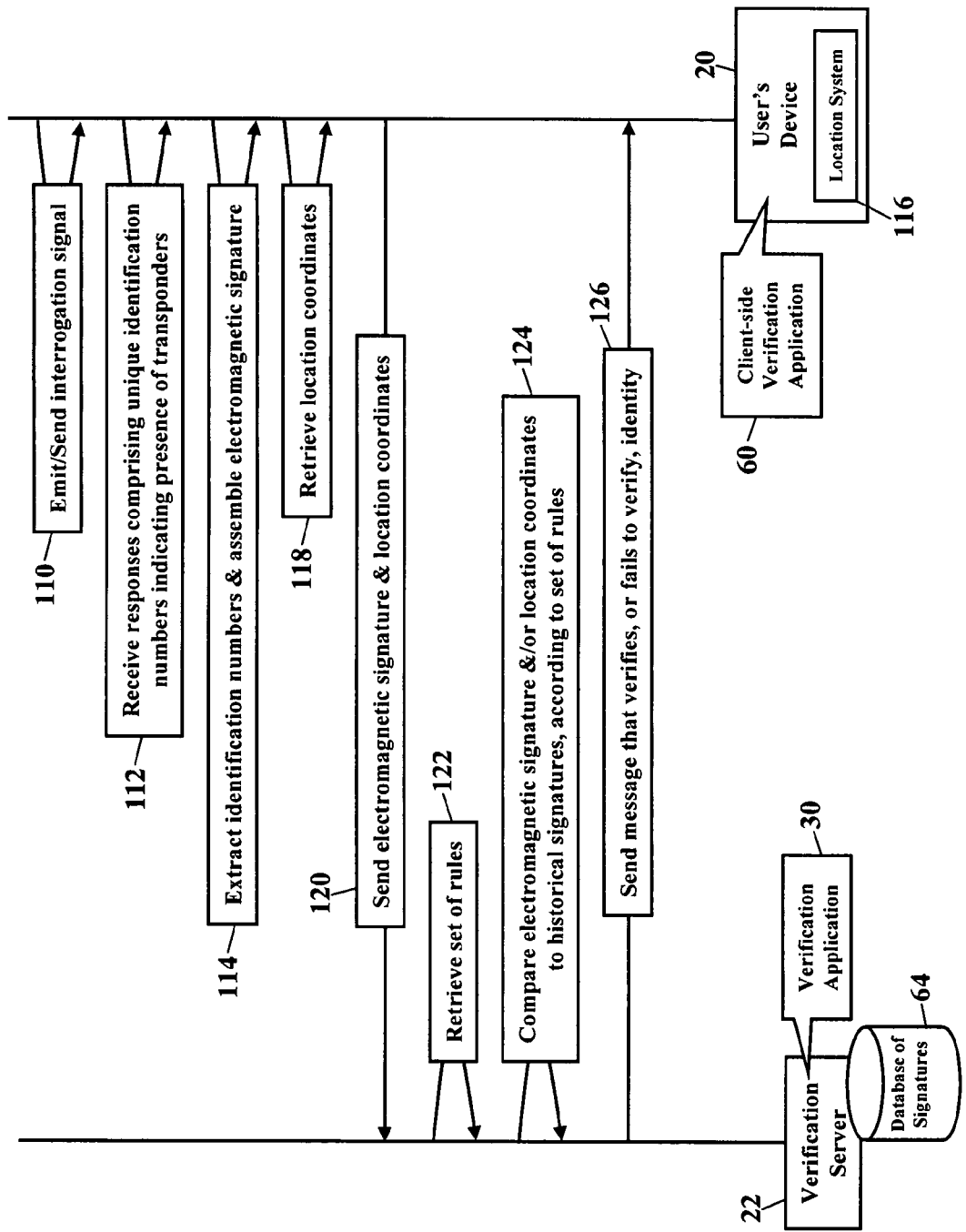
FIG. 5 is a schematic illustrating another process of verifying a user's identity, according to even more exemplary embodiments.

FIG. 5 is a schematic illustrating another process of verifying a user's identity, according to even more exemplary embodiments. Here the user's device 20 also reports or sends its current location to the verification application 30. The device's current location may then be used when comparing signatures. As FIG. 5 illustrates, the client-side verification application 60 sends an interrogation signal (Step 110). Responses are received that comprise unique identification numbers indicating the presence of one or more transponders (Step 112). Each transponder's unique identification number is extracted and assembled into a signature (Step 114). The signature may thus comprise a listing or set of the unique identification numbers representing the constellation of transponders currently associated with the user's device 20. The client-side location application 60 may obtain, receive, or retrieve location coordinates from a location system 116 associated with the user's device 20 (Step 118). As the user carries the device 20, the location system 116 monitors or tracks the location coordinates (illustrated as reference numeral 76 in FIG. 7) of the user's device 20. The verification application 60 sends the signature 26 and/or the location coordinates of the user's device 20 (Step 120). The location system 116 may utilize triangulation and/or global positioning system information. While the location system 116 is shown residing or operating in the user's device 20, the location system 116 may operate within the verification server 22. Moreover, the location system 116 may alternatively or additionally be a service provided by a separate server and accessible via the communications network 24. Because, however, location systems are well known to those of ordinary skill in the art, no further discussion is made.

When the verification server 22 receives the signature and/or the location coordinates, the verification application 30 may retrieve the set of rules (Step 122). The signature and/or the location coordinates are compared to one or more historical signatures, according to the set of rules (Step 124). The verification application 30 may then send a message that verifies, or fails to verify, the identity of the user (Step 126).

Here, again, the set of rules may specify a strict or lax comparison. The set of rules may specify membership sets for particular locations. When the location coordinates indicate the user's device 20 is located at a work facility, for example, then the set of rules may be configured to always require identification numbers representing an employment badge and other work-related articles. If those work-related identification numbers are not observed, then the verification application 30 may or may not deny verification of the user's identity. If the location coordinates indicate the user's device 20 is located at a bank or other financial institution, then the set of rules may require identification numbers representing the user's wallet, car key(s), checking/savings book, and even a key to a safety-deposit box. If the identification numbers associated with these banking items are not present, then the verification application 30 may be required to decline to verify the user's identity.

The set of rules may also require historical matches by location. When the verification application 30 receives the location coordinates, the set of rules may require a historical match of identification numbers for that same location. The verification application 30 may be required to query the database 64 of signatures for the current location coordinates and retrieve all the historical signatures for that same location. If any unique identification numbers are always present in those historical signatures, then the set of rules may require that same identification number be present in the currently-received signature (e.g., the current "constellation"). The verification application 30 thus retrieves and compares the historical signatures according to location. When one or more identification numbers are present in all the historical signatures, then the verification application 30 compares the listing or set 62 for those same identification numbers. If the same identification number/numbers is/are present in the currently-received signature, then the verification application 30 may verify the identity of the current user. If the same identification number/numbers are not present, then the set of rules may require that the verification application 30 deny the identity of the current user.

The set of rules may be more lenient. When the verification application 30 receives the location coordinates, the set of rules may permit a less than exact historical match of identification numbers for that same location. The verification application 30 may retrieve the historical signatures for that same location and identify any identification numbers that are present in ninety percent (90%), seventy five percent (75%), or some other threshold percentage of the historical signatures. The set of rules may require the presence of groupings, such as identification numbers that tend to be present with other identification numbers, perhaps by location. When some identification numbers are usually historically grouped together for the same location, then the set of rules may require that same grouping for the same location. The set of rules, in short, may be configured to strictly or leniently verify the identity of the user.

Figure 6:
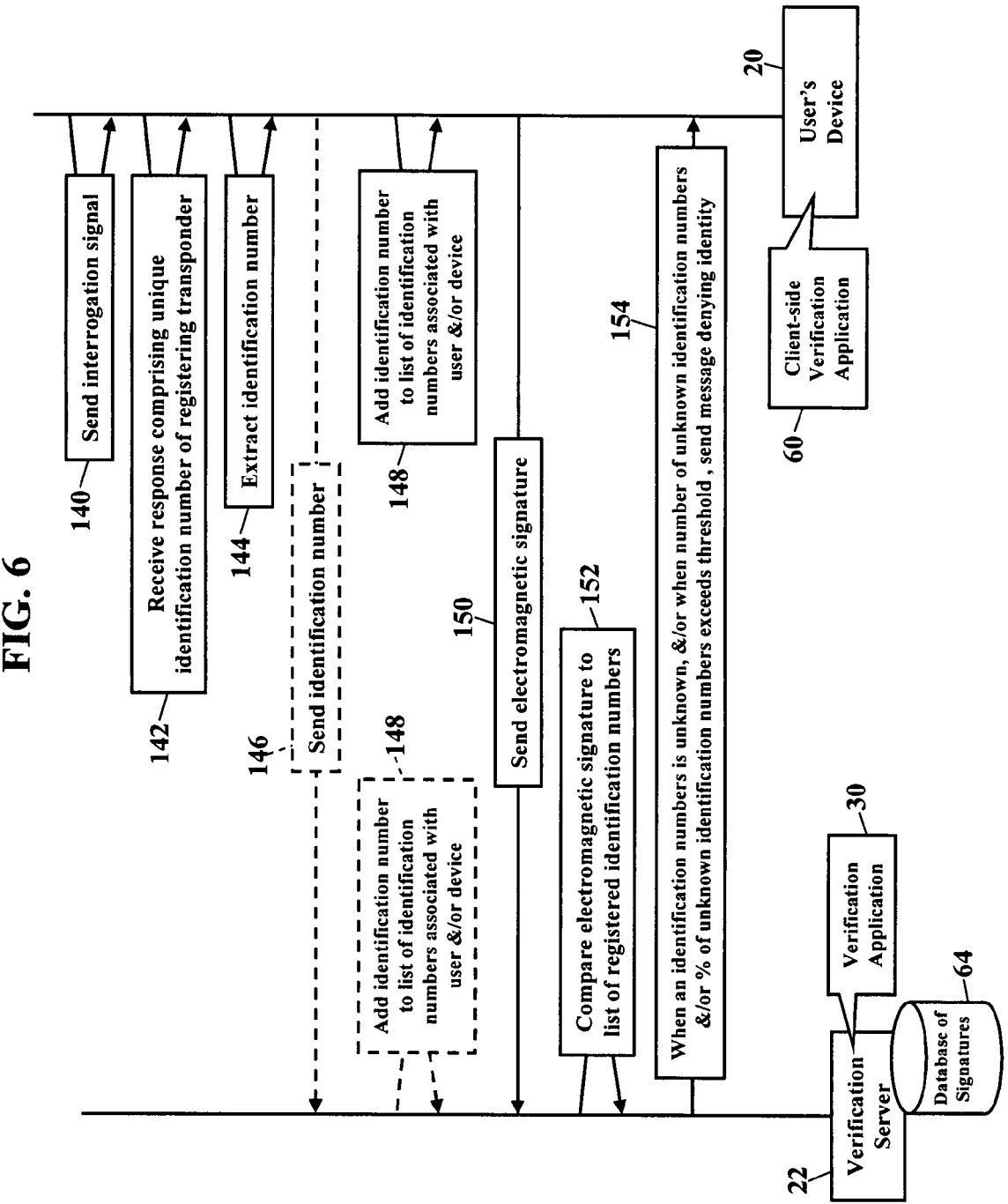
FIG. 6 is a schematic illustrating a process for registering personal items, according to even more exemplary embodiments.

FIG. 6 is a schematic illustrating a process for registering personal items, according to even more exemplary embodiments. According to exemplary embodiments, the user places the item's associated transponder in proximity to the user's device 20 and activates a registration mode of operation that causes the client-side verification application 60 to send the interrogation signal (Step 140). The transponder's response is received that includes its associated unique identification number (Step 142). The transponder's unique identification number is extracted (Step 144). The unique identification number may optionally be sent to the server-side verification application 30 (Step 146). The unique identification number is added to a list of identification numbers associated with the user and/or the device 20 (Step 148). The list is thus updated to contain all the unique identification numbers that are registered with the device 20.

Exemplary embodiments may thus quickly decline verification, based on the presence of unknown identification numbers. When the client-side verification application 60 sends the signature (Step 150), the verification application 30 compares the signature to the list of identification numbers that are registered with the device 20 (Step 152). When one or more identification numbers are unknown, and/or when the number of unknown identification numbers and/or percentage of unknown identification numbers exceeds a threshold, then the verification application 30 may send a message that denies the identity of the user (Step 154). Rules may also be established that check for redundancy and/or combinations which should not be present. When two wallets, for example, or two watches are present, exemplary embodiments may decline to verify identity. Rules may be defined that associate a single person wearing two watches or carrying two wallets at the same time as unusual and/or suspicious. Of course, rules may accommodate exceptions when, for instance, a person chooses to carry two separate wallets. Note that some schemes of transponder identification numbers allow determination of the type of item, e.g., a watch versus a wallet, from one or more portions and/or aspects of the identification number.

Exemplary embodiments thus monitor for strange or unknown articles. Whenever the current constellation of articles contains an unknown item, then the current user of the device 20 may be an imposter. A strange identification number, for example, may indicate an imposter's watch, pants, or other item is responding to the interrogation signal. The verification application 30 may thus be configured to automatically decline verification when unknown or never-seen identification numbers are present.

Figure 7:
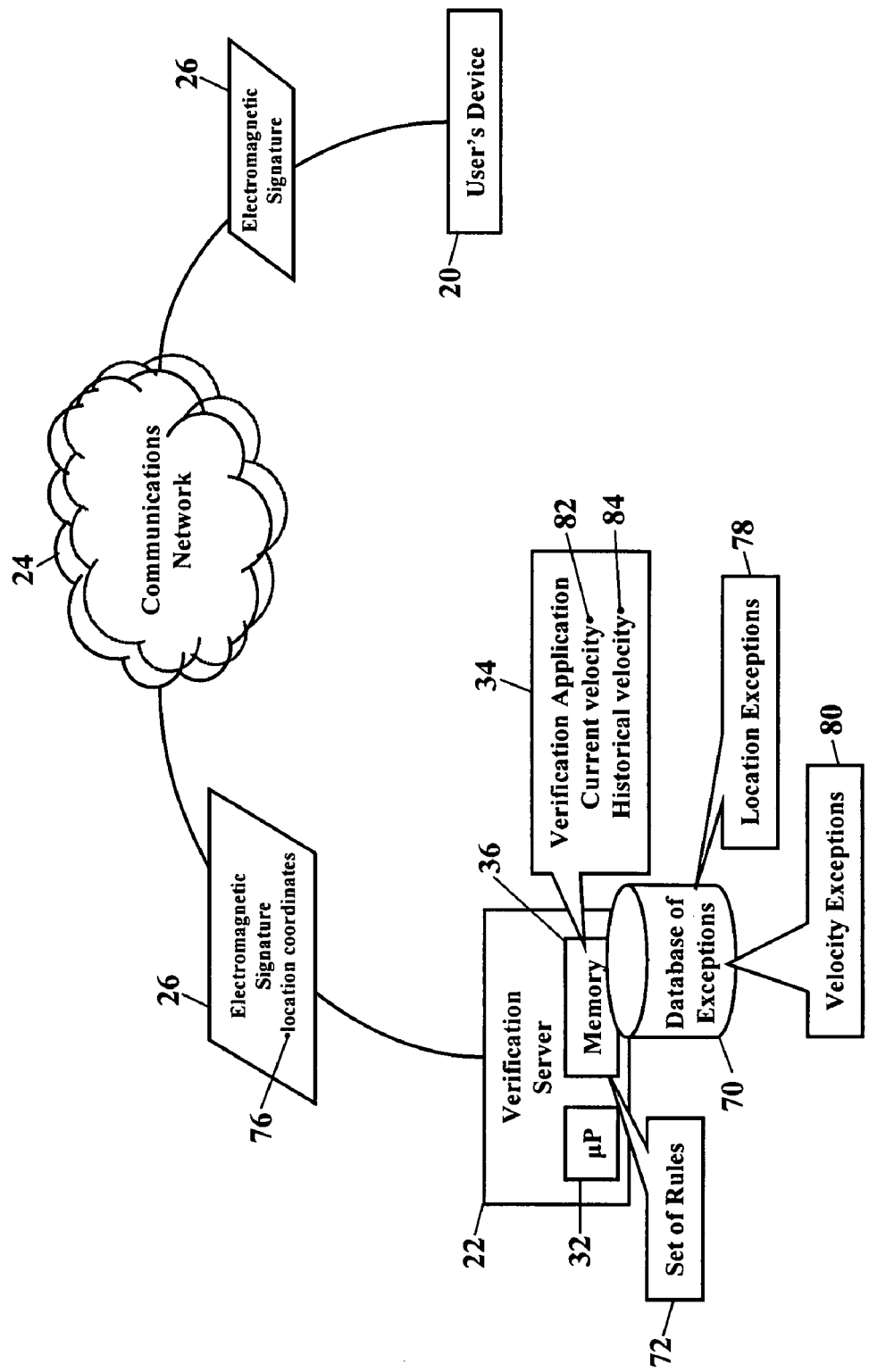
FIG. 7 is a schematic illustrating exceptions, according to even more exemplary embodiments.

FIG. 7 is a schematic illustrating exceptions, according to even more exemplary embodiments. When the verification application 30 receives the signature 26, the verification application 30 may query a database 70 of exceptions for the signature 26. The database 70 of exceptions may store identification numbers, locations, and/or more rules for which verification is automatically and/or immediately denied. That is, if any identification number and/or location in the signature 26 matches any entry in the database 70 of exceptions, then the user and/or the requestor may require immediate denial of identity verification. The database 70 of exceptions, for example, may store an identification number that corresponds to a rare gun that is normally stored under lock and key in the user's home. If the gun's unique identification number is ever detected outside the home, then the gun may have been stolen. The database 70 of exceptions may similarly store an identification number that corresponds to the user's purse. If the purse's unique identification number is detected outside the home between the hours of midnight and 6 AM, then the purse may have been stolen.

The database 70 of exceptions may even store identification numbers and/or locations for which physical identification is always required. The legitimate user, for example, may desire that any banking transaction always require presentation of a driver's license or other physical identification. Whenever the signature 26 indicates a banking location, then the set 72 of rules may automatically decline to verify the user's identity. The verification application 30, in other words, forces the user to present picture identification before any financial transaction is completed. Likewise, if a credit card transaction is being requested, the set 72 of rules may automatically decline to verify the user's identity, thus forcing the user to present a driver's license before the transaction is approved.

The database 70 of exceptions may also store forbidden location exceptions 78. Whenever the signature 26 matches a forbidden location, then verification is immediately and automatically denied. That is, if the location coordinates 76 matches any forbidden location exceptions 78, then the user and/or the requester requires immediate denial of identity verification. The database 70 of exceptions thus stores location coordinates or information for which a legitimate, verified user would never be found/observed. Pornographic stores, private clubs, restricted access locations, remote islands, or any other locations at which the user should not be observed. When the verification application 30 receives an affirmative response from the database 70 of exceptions, then the verification application 30 denies identity verification.

FIG. 7 also illustrates velocity exceptions 80. The verification application 30 may receive, or calculate, changes in location over time (e.g., velocity). The verification application 30 may then compare a current velocity 82 to historical velocities 84. When the current velocity 82 is faster or slower than the historical velocity 84 (perhaps over the same route), then the verification application 30 may have authority to deny verification. Moreover, the database 70 of exceptions may store velocities for which verification is immediately and automatically denied. That is, if the current velocity 82 is greater than the historical velocity 84, then an imposter may have obtained the device 20. If the legitimate, historical user consistently drives twenty five miles per hour in a school zone, and the current velocity 82 is forty miles per hour, then an imposter may have obtained the device 20. If the legitimate, historical user would never fly in an airplane, and the current velocity 82 is over eighty miles per hour, then an imposter may have obtained the device 20. When the verification application 30 queries for velocity and receives an affirmative response from the database 70 of exceptions, then the verification application 30 may deny identity verification.

The database 70 of exceptions may also store forbidden or suspicious combinations. The signature 26, as earlier explained, may comprise the listing or set 62 of the unique identification numbers (and/or signal characteristics and/or other data and/or parameters) representing the constellation of transponders 42 currently associated with the user (as illustrated in FIG. 2). The listing or set 62 thus describes the constellation of personal assets associated with the current user of the device. The database 70 of exceptions, then may store identification numbers, characteristics, or parameters for items that are not permitted. The database 70 of exceptions, for example, may store identification numbers for firearms, explosives, contraband, or other items for which verification is denied. The database 70 of exceptions may also store combinations of identification numbers for which verification is denied, such as alcoholic items and firearms or other impermissible combinations. The database 70 of exceptions may also store "suspicious" identification numbers or combinations for which any verification score or rating is discounted.

Figure 8:
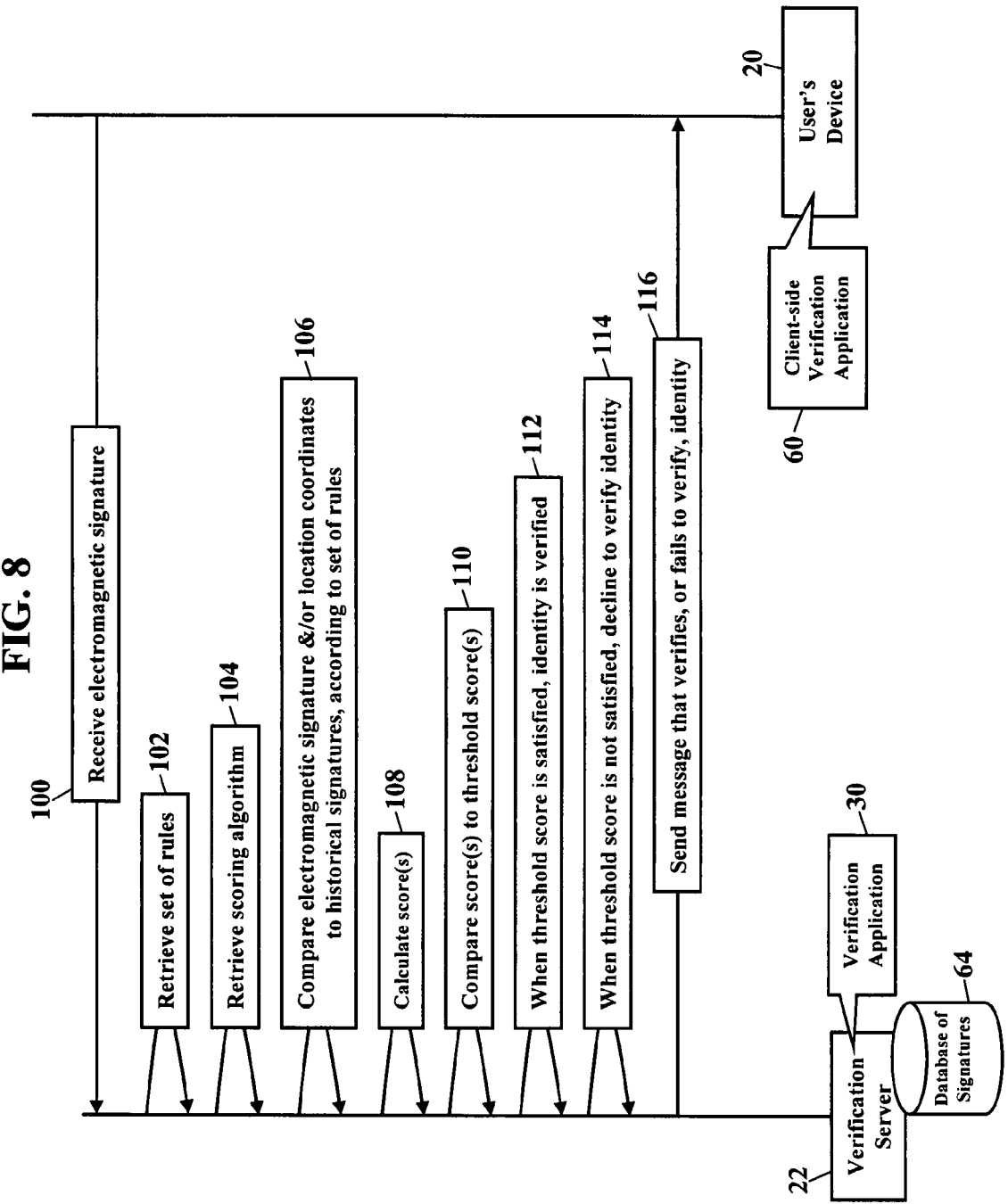
FIG. 8 is a schematic illustrating a process for scoring electromagnetic signatures, according to still more exemplary embodiments.

FIG. 8 is a schematic illustrating a process for scoring signatures, according to still more exemplary embodiments. Here the verification application 30 scores, or numerically evaluates, how well the signature 26 matches one or more historical signatures, as defined by a scoring algorithm. The verification server 22 receives the signature (Step 100), retrieves the set of rules (Step 102), and retrieves a scoring algorithm (Step 104). The scoring algorithm numerically evaluates how well the signature 26 matches one or more historical signatures, as defined by the scoring algorithm. The scoring algorithm may be any simple or complex formula, relationship, pattern matching process, string equation, or logical comparison. The scoring algorithm, however, may have any structure and/or language, such as MathML or OpenMath. In addition, the third party requestor may supply the scoring algorithm in the form of mobile executable code (e.g., Java byte code). The third party requestor may thus specify the scoring algorithm, thus allowing the requestor to determine how strictly the current user's identity is verified. The complexity of the third party's scoring algorithm, however, may be restricted to not substantially hinder the performance of the verification application 30 or the verification server 22 itself. The verification application 30 may inspect the scoring algorithm and estimate its complexity. The verification application 30 may measure the bit or byte length of the scoring algorithm and compare to a threshold size. The verification application 30 may inspect the scoring algorithm for terms, mathematical operations/operands, or mathematical functions that indicate complexity. If such indicators are found, the verification application 30 could reject the third party's scoring algorithm. The verification application 30 may even utilize multiple scoring algorithms and select one or more of the outcomes.

Whatever the scoring algorithm, the verification application 30 determines the identity of the current user of the device 20. The signature and/or the location coordinates are compared to one or more historical signatures, according to the set of rules (Step 106). The verification application 30 calculates a score (Step 108) as a measure of identity. If multiple scoring algorithms are used, a score may be calculated for each algorithm. The best score(s) may be chosen for identity verification, or the multiple scores may be combined and/or weighted to produce an overall, final score.

The verification application 30 may compare the score(s) to a threshold score (Step 110). The threshold score may represent a necessary score at which the identity of the user may be verified. When the currently-received signature adequately matches some historical signature, then the score may indicate that the user matches the historical user. If there is little or no difference between the signature and a historical signature, then the threshold score may be satisfied and the identity of the user is verified (Step 112). When the signature unfavorably compares to the historical signatures, then the threshold score may not be satisfied and the verification application 30 may decline to verify the identity of the user of the device (Step 114). The verification application 30 may then send a message to the device 20 that verifies, or fails to verify, the identity of the user (Step 116). The verification application 30 may additionally or alternatively send the message to the third party requestor.

The threshold score may be configurable. The threshold score represents some configurable score that is required to verify the identity of the user. The threshold score is preferably stored in the memory of the verification server 22, but the threshold score may be remotely accessed (via the communications network 24 shown in FIG. 1). The threshold score may even be supplied by the verification requester (e.g., a third party). A user of the device 20, for example, may establish a strict threshold score so that even slight variations or differences (between the currently-received electromagnetic signature and the historical signatures) result in a failed verification. A more lax threshold score may verify the user despite differences in location and/or identification numbers. Similarly, the third party requestor may specify a strict threshold score to reduce the chances of fraudulent purchases, transactions, and other activities. Note that the set of rules, the verification algorithms, and the threshold score(s) may be made adaptable based on adaptation rules and parameters, such as the month, week, day of week, time of day, frequency of verification requests, and/or frequency of verification denials. Also, multiple thresholds and/or threshold scores may be used in some cases, as for example when rules are made conditional on various inputs and/or are triggered by particular occurrences or conditions.

Figure 9:
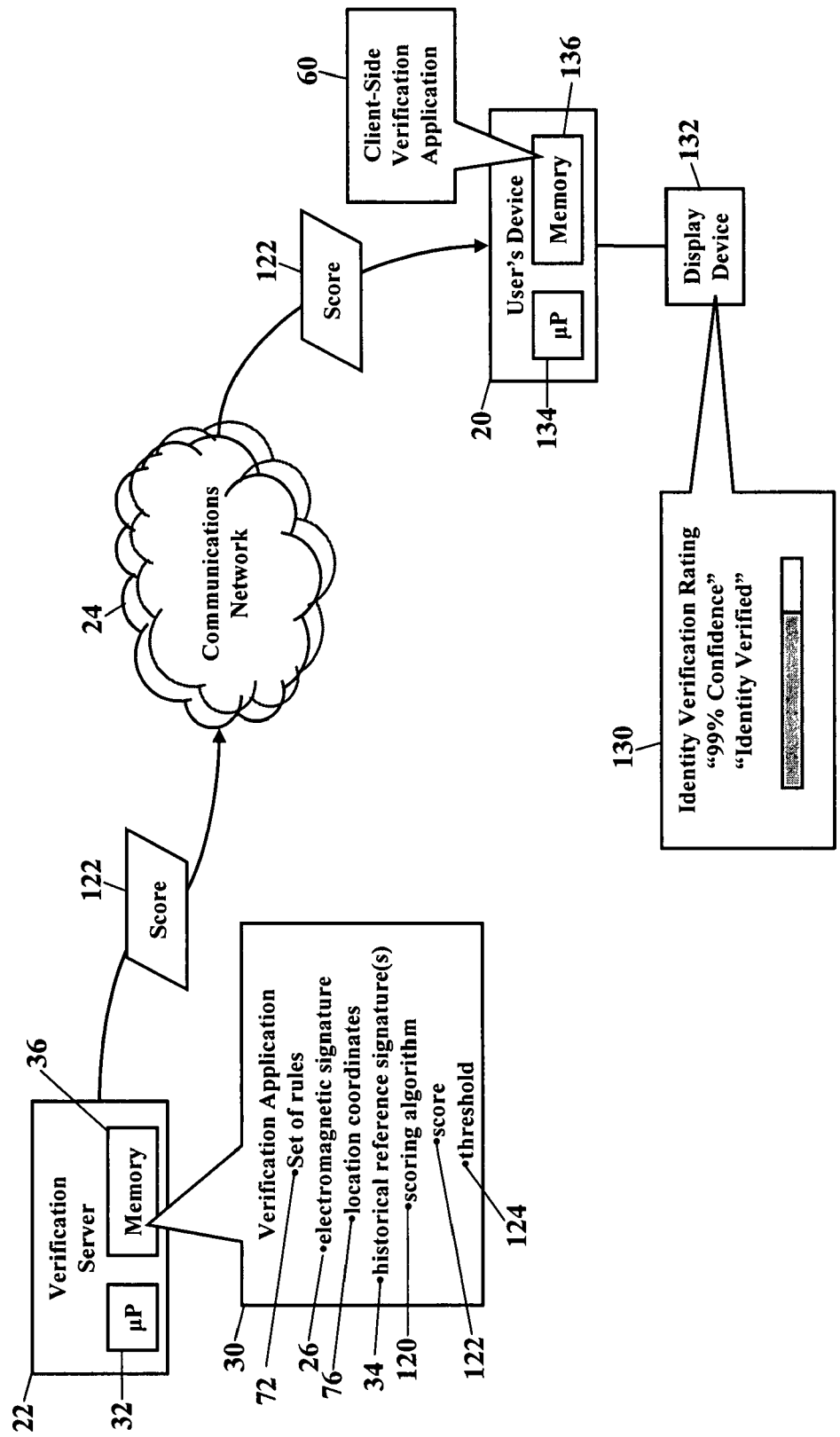
FIG. 9 is a schematic illustrating presentation of an identity verification rating, according to still more exemplary embodiments.

FIG. 9 is a schematic illustrating presentation of an identity verification rating 130, according to still more exemplary embodiments. Here, when the verification application 30 scores the user's identity (as explained with reference to FIG. 8), the verification application 30 may send that score (and/or an appropriately calculated rating based on that score) to the user's device 20. The verification application 30, in fact, may send the score and/or rating to any device associated with the user and/or to any device for identity verification purposes. The verification application 30 retrieves the set 72 of rules and compares the signature 26 and/or the location coordinates 76 to one or more of the historical reference signatures 34, according to the set 72 of rules. The verification application 30 may access the scoring algorithm 120, calculate the score 122, and compare the score 122 to the threshold score 124. The rating may be determined from the score if, for example, the scale of the score varies by algorithm. The score or rating may be scaled or configured to be within the range of "0" to "100," with greater numbers having more confidence.

The user's device 20 presents the identity verification rating 130. The identity verification rating 130 is illustrated as an icon or notification that is visually presented on a display device 132 of the user's device 20, yet the identity verification rating 130 may also have audible features. The client-side verification application 60 instructs a host processor 134 to receive the score 122 and to present the identity verification rating 130. The identity verification rating 130, for example, may be a numerical presentation or bar graph of the score 122 (e.g. a probability or confidence level). The identity verification rating 130, however, may be a simple "green" icon that indicates the user has been verified. A "red" icon may indicate that the current user is an imposter and that verification is or should be denied. The identity verification rating 130 may be any graphical, audible, or visual indicator of the user's identity verification.

The identity verification rating 130 may be produced as proof of identity. Because the identity verification rating 130 is visually produced at the user's device 20, the user may thus use the device 20 as verification of identity. Whenever a merchant, for example, requires identity verification, the user may simply and quickly produce the device 20 with the identity verification rating 130 presented on the display device 132. The identity verification rating 130 may even additionally retrieve a name, address, and driver's license number from a host memory 136, and the identity verification rating 130 may additionally present this and/or any other suitable information. When the identity verification rating 130 is high, for example, the merchant may confidently accept the user's identity. When, however, the verification application 30 sees unusual or even suspicious data, the identity verification rating 130 may drop in value, so the merchant may be reluctant to verify the identity of the user. Additional identification, such as a physical driver's license or social security card, may then be desired and/or specifically required by the merchant.

Figure 10:
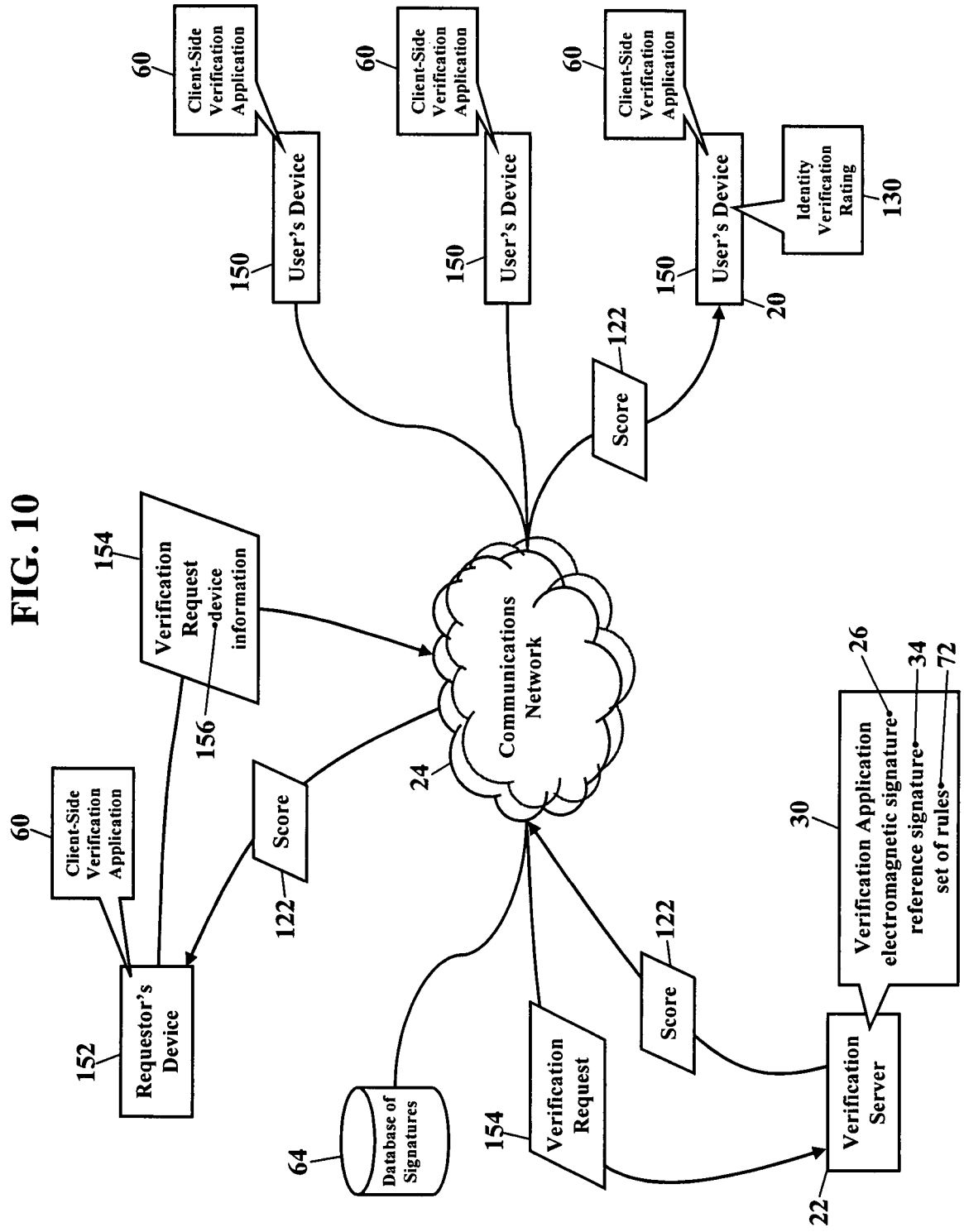
FIG. 10 is a schematic illustrating an alternative, centralized operating environment, according to more exemplary embodiments.

FIG. 10 is a schematic illustrating an alternative, centralized operating environment, according to more exemplary embodiments. Here the verification server 22 communicates with multiple user devices 150 via the communications network 24. The verification server 22 also communicates with one or more third party requestor's devices 152 via the communications network 24. The verification application 30 operates in the centralized verification server 22. An instance of the client-side verification application 60 operates in each of the users' devices 150. Whenever a third party (such as a merchant) desires to verify the identity of a user, the third party's corresponding device 152 sends a verification request 154. The verification request 154 includes device information 156 that uniquely identifies the device for which identity verification is desired. The device information 156, for example, may include a machine address code, a serial number, an Internet Protocol address, or any other alphanumeric combination. When the verification application 30 receives the verification request 154, the verification application 30 queries the desired device 150 for a recent electromagnetic signature 26. The verification application 30 compares the signature 26 to one or more historical reference signatures 34, according to the set 72 of rules. The verification application 30 calculates the score 122 and sends the score 122 to the user's device 20 and/or to the third party's requesting device 152. The user's device 20 may then visually and/or audibly present the identity verification rating 130, as above explained.

Figure 11:
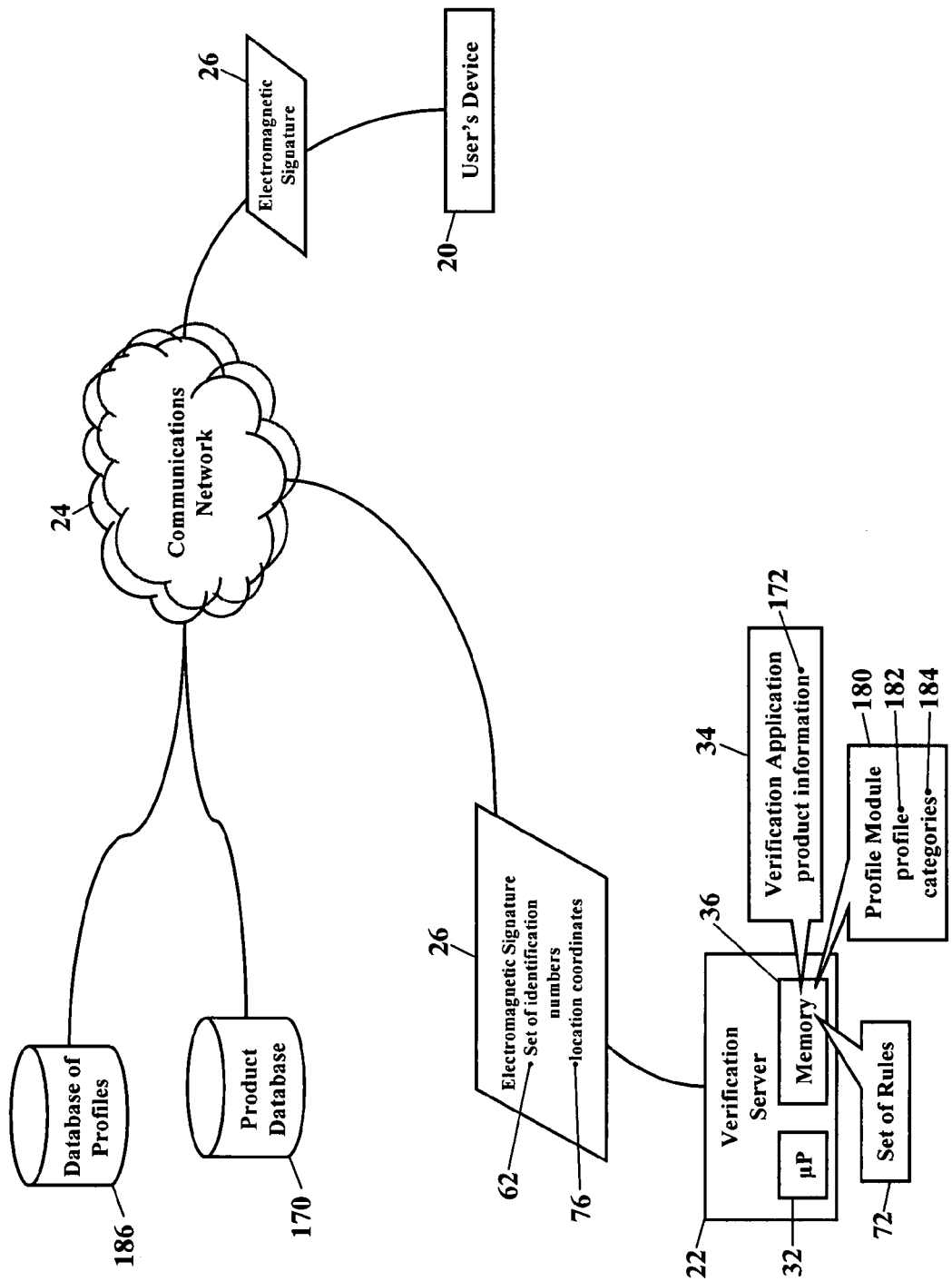
FIG. 11 is a schematic illustrating targeted content, according to more exemplary embodiments.

FIG. 11 is a schematic illustrating targeted content, according to more exemplary embodiments. Here the verification application 30 may also profile the user, based on the constellation of transponders in proximity of the user. The verification application 30, as earlier explained, receives the signature 26 from the user's device 20. The signature 26 may comprise the set 62 of identification numbers that responded to an interrogation. The signature 26 may also comprise the location coordinates 76. The verification application 30 then queries a product database 170 for each identification number. The product database 170 maps, relates, or otherwise associates each identification number to product information. The product database 170 is illustrated as being remotely accessible via the communications network 24, but the product database 170 may be locally stored in the memory 36 of the verification server 22. Recall that, according to exemplary embodiments, each identification number uniquely identifies a transponder associated with an article. The verification application 30 may thus query the product database 170 to retrieve any product information 172 associated with an identification number. The verification application 30, for example, may retrieve a description of each article, type of article, one or more categories associated with each article, a model number, the manufacturer, color(s), pricing, point of sale or merchant, ownership history, warranty information, and any other information associated with the identification number. The verification application 30 collects the product information 172 for each identification number. The product database 170 is known to those of ordinary skill in the art and, thus, not described in great detail.

The verification application 30 then consults a profile module 180. The profile module 180 is an independent or adjunct software engine that profiles the user, based on the product information 172. The profile module 180 analyzes the product information 172 for each identification number. The profile module 180 may also consult the set 72 of rules when developing a profile 182. The set 72 of rules may provide instructions and/or relationships when analyzing the product information 172. The set 72 of rules, for example, may be supplied by the verification requestor (e.g., attached to or specified by the verification request illustrated as Step 80 in FIG. 3). If the verification requestor is a jewelry manufacturer or merchant, the set 72 of rules may specify that the requester wants a profile of the user's watch, ring, and other jewelry. If the verification requester is a clothing retailer, the requester may want a profile of the user's jacket, shoes, pants, and other clothing. A tool manufacturer may want a profile of the user's constellation of clothing and tools.

The profile module 180 may also categorize the user. As the profile module 180 analyzes the product information 172 for each identification number, the profile module 180 may categorize the user, again perhaps according to the set 72 of rules. The set 72 of rules may define categories 184 for which the user is interested. When, for example, the user's profile 182 indicates expensive jewelry and clothing, the user may be demographically categorized as an affluent person. If the user's profile 182 indicates athletic clothing, such as a sweat suit, running shorts and shoes, or even a tennis racket, then the user may be categorized as one who enjoys tennis and perhaps other sports. If the user's constellation of transponders 42 includes toys, a stroller, baby formula, or other infant/children articles, then the user may be categorized as a parent with young children. The profile module 180 may even analyze or combine public information, such as telephone directory listings, when categorizing the user. The user's publicly-available name, address, and/or ZIP code may be used to categorize the user. A demographically wealthy address, for example, may augment categorization. Even semi-public information, such as membership lists (when obtainable), may augment categorization. The profile module 180 may broadly and/or narrowly categorize users, based on their current and/or historical constellation of articles and any augmenting information.

The user's profile 182 is then stored. The user's profile 182 may be stored in the user's device 20 and/or in a database 186 of profiles. The database 186 of profiles may be a central repository for user profiles. The database 186 of profiles is illustrated as being remotely accessible via the communications network 24, but the database 186 of profiles may be locally stored in the memory 36 of the verification server 22.

The user's profile 182 may include a listing of all the identification numbers that are associated with the user's current constellation. The user's profile 182 may additionally or alternatively include a listing of all identification numbers that have been historically associated with the user. The user's profile 182 may additionally or alternatively store the categories 184, based on current and/or historical identification numbers.

The database 186 of profiles may be queried for information. According to exemplary embodiments, each profile 182 in the database 186 of profiles describes a user, based on their constellation of articles. The database 186 of profiles thus represents an attractive data repository that can be shared with merchants, advertisers, and marketers. The database 186 of profiles, for example, may be queried for those users who are most likely to purchase a merchant's goods and services. An advertiser may query the database 186 of profiles for categories or traits of interest. The advertiser may then target advertisements and promotions to those users that are more likely to respond. Even content providers may query the database 186 of profiles to discover those users most likely to favorably receive programming, advertisements, and files. Exemplary embodiments thus validate a user's identity and also help target advertisements, promotions, and content, all based on the user's current or historical constellation.

Figure 12:
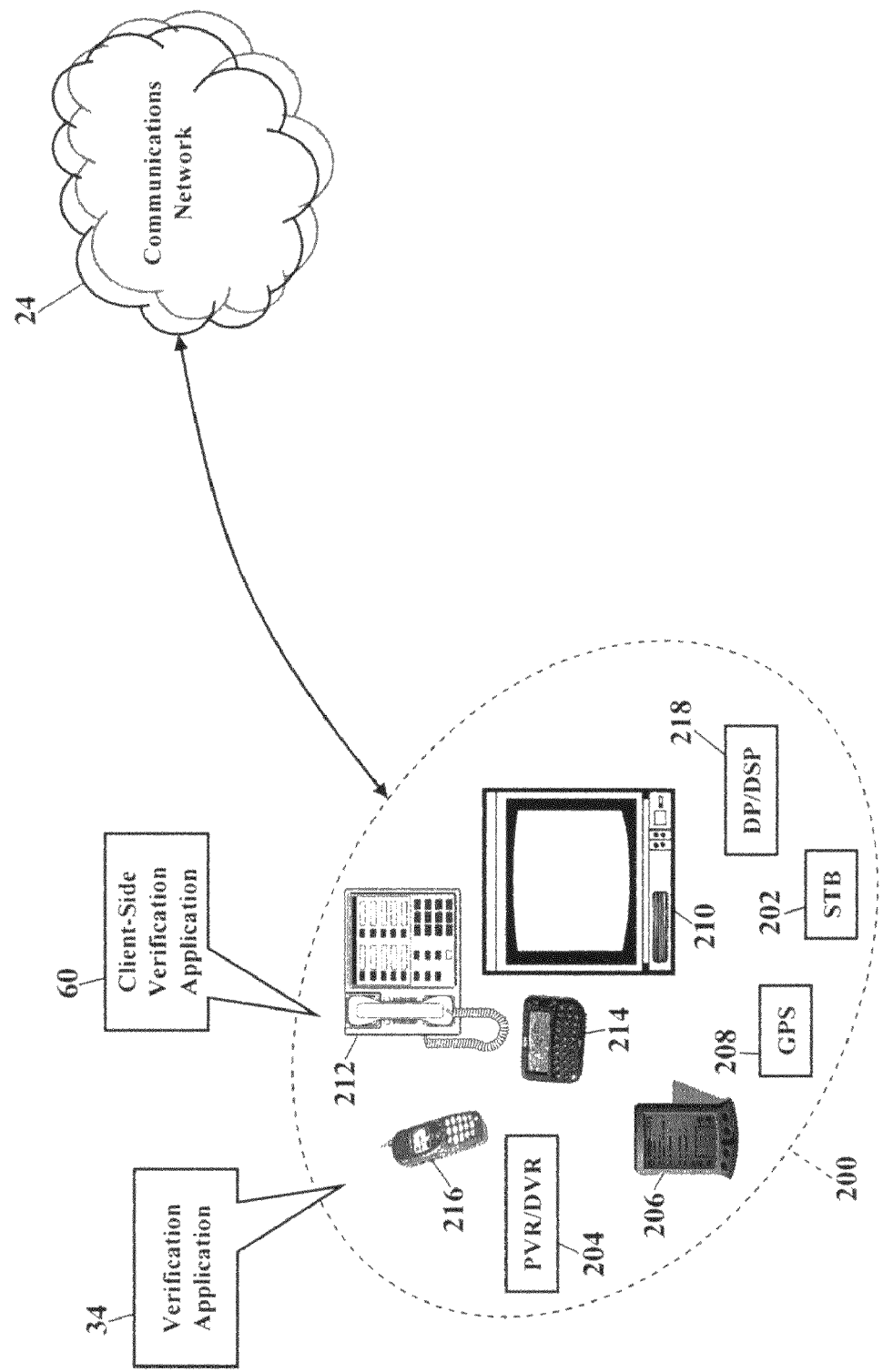
FIG. 12 depicts other possible operating environments for additional aspects of the exemplary embodiments.

FIG. 12 depicts other possible operating environments for additional aspects of the exemplary embodiments. FIG. 12 illustrates that the verification application 30 and/or the client-side verification application 60 may alternatively or additionally operate within various other devices 200. FIG. 12, for example, illustrates that the verification application 30 and/or the client-side verification application 60 may entirely or partially operate within a set-top box (202), a personal/digital video recorder (PVR/DVR) 204, personal digital assistant (PDA) 206, a Global Positioning System (GPS) device 208, an interactive television 210, an Internet Protocol (IP) phone 212, a pager 214, a cellular/satellite phone 216, or any computer system and/or communications device utilizing a digital processor and/or digital signal processor (DP/DSP) 218. The device 200 may also include watches, radios, vehicle electronics, clocks, printers, gateways, mobile/implantable medical devices, and other apparatuses and systems. Because the architecture and operating principles of the various devices 200 are well known, the hardware and software componentry of the various devices 200 are not further shown and described. If, however, the reader desires more details, the reader is invited to consult the following sources, all incorporated herein by reference in their entirety: LAWRENCE HARTE et al., GSM SUPERPHONES (1999); SIEGMUND REDL et al., GSM AND PERSONAL COMMUNICATIONS HANDBOOK (1998); and JOACHIM TISAL, GSM CELLULAR RADIO TELEPHONY (1997); the GSM Standard 2.17, formally known *Subscriber Identity Modules, Functional Characteristics* (GSM 02.17 V3.2.0 (1995-01))"; the GSM Standard 11.11, formally known as *Specification of the Subscriber Identity Module—Mobile Equipment (Subscriber Identity Module—ME) interface* (GSM 11.11 V5.3.0 (1996-07))"; MICHEAL ROBIN & MICHEL POULIN, DIGITAL TELEVISION FUNDAMENTALS (2000); JERRY WHITAKER AND BLAIR BENSON, VIDEO AND TELEVISION ENGINEERING (2003); JERRY WHITAKER, DTV HANDBOOK (2001); JERRY WHITAKER, DTV: THE REVOLUTION IN ELECTRONIC IMAGING (1998); and EDWARD M. SCHWALB, ITV HANDBOOK: TECHNOLOGIES AND STANDARDS (2004).

Figure 13:
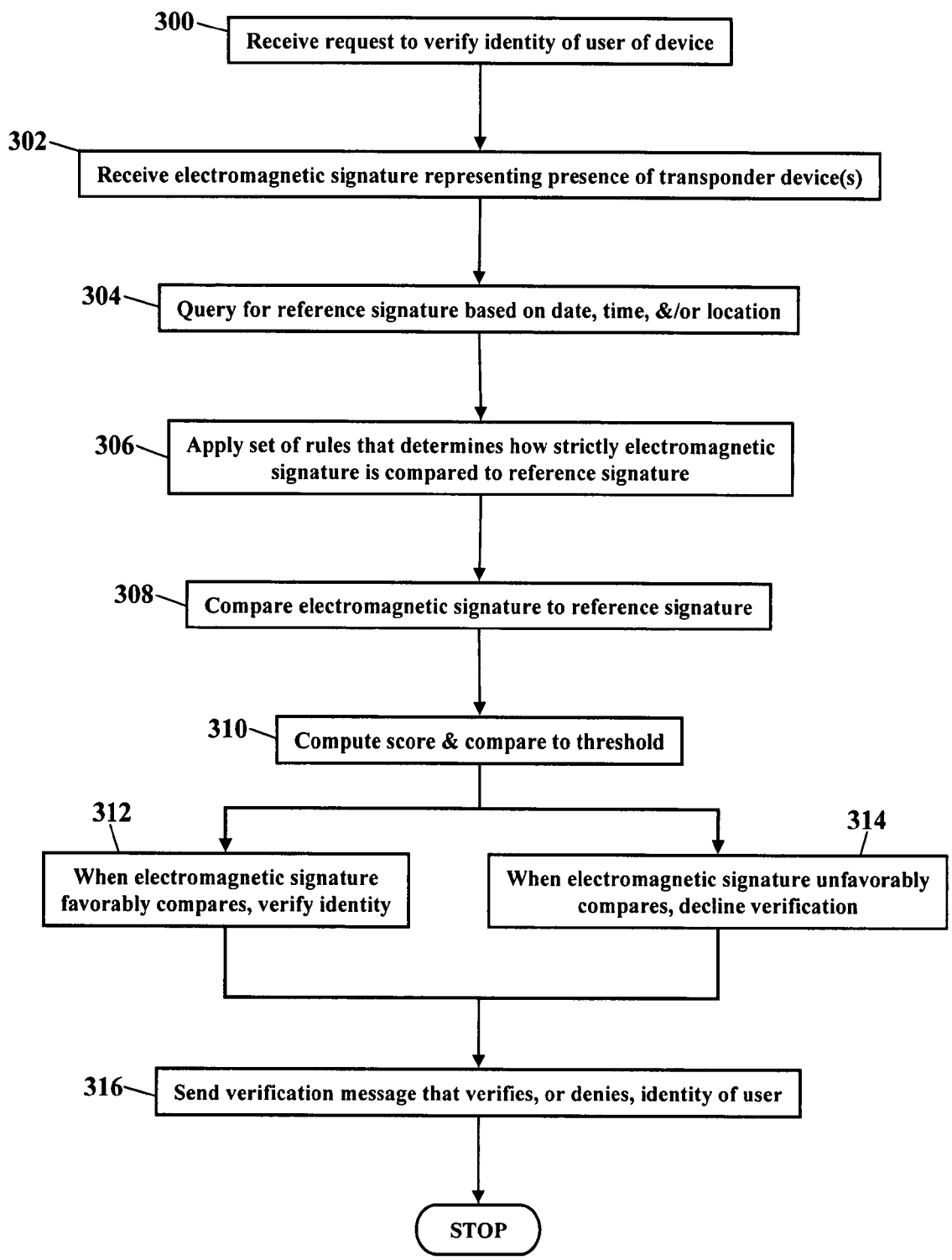
FIG. 13 is a flowchart illustrating a method of verifying identity, according to even more exemplary embodiments.

FIG. 13 is a flowchart illustrating a method of verifying identity, according to even more exemplary embodiments. A processor receives a request to verify the identity of a user (Block 300). The processor also receives one or more signatures representing the presence of one or more devices (Block 302). The processor queries for a reference signature based on at least one of a date, a time, and a location of the device (Block 304). The processor applies a set of rules that determines how strictly the signature is compared to the reference signature (Block 306). The processor compares the signatures to the reference signature (Block 308). The processor computes a score and compares the score to a threshold score (Block 310). When any of the signatures favorably compare, then the processor verifies an identity of a user associated with the device (Block 312). When the signature unfavorably compares to the reference signature, then the processor declines to verify the identity of the user (Block 314). The processor sends a message that verifies, or denies, the identity of the user (Block 316).

Figure 14:
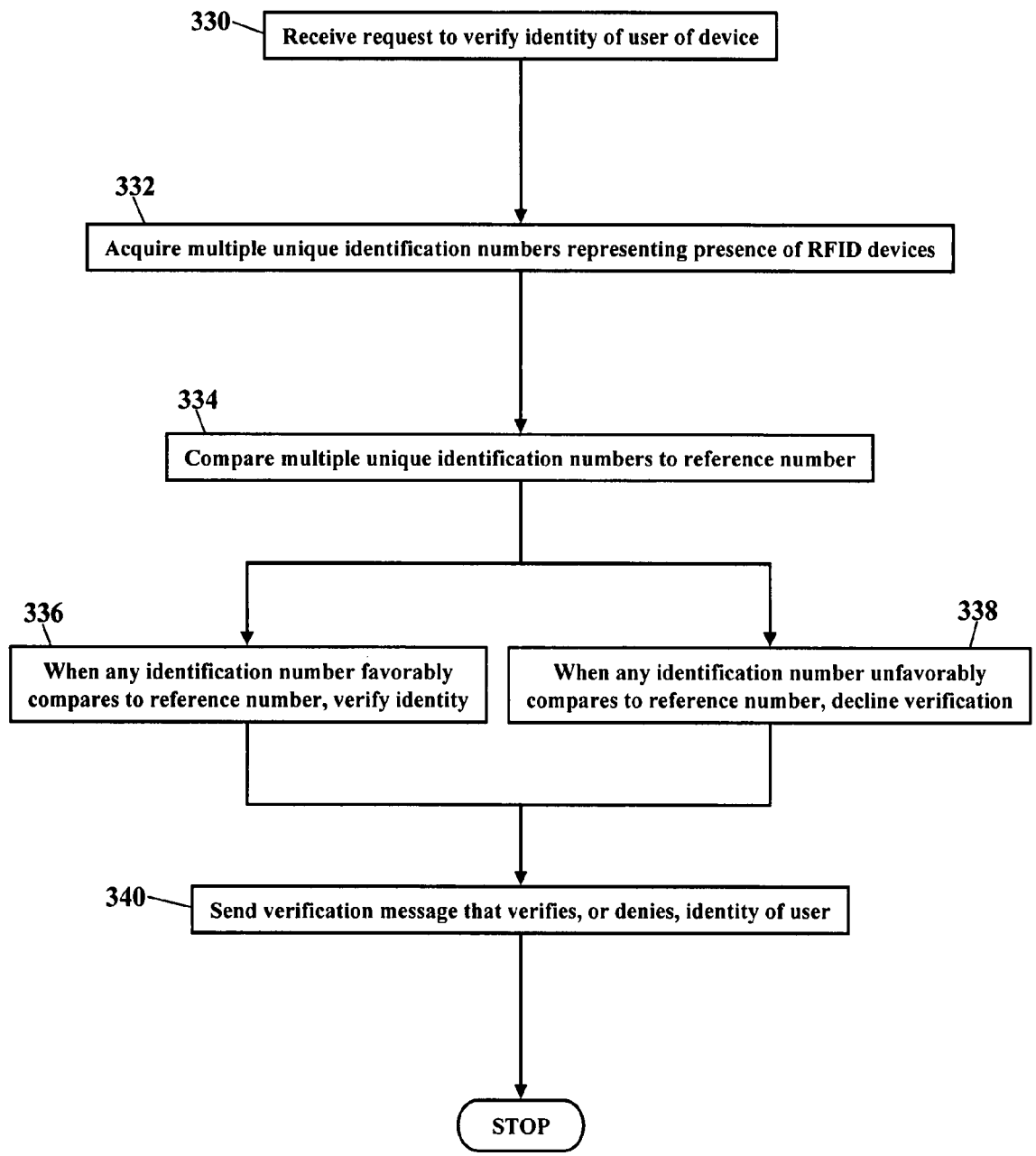
FIG. 14 is a flowchart illustrating another method of verifying identity, according to more exemplary embodiments.

FIG. 14 is a flowchart illustrating another method of verifying identity, according to more exemplary embodiments. A processor receives a request to verify the identity of a user of a device (Block 330). The processor acquires multiple unique identification numbers that represent the presence of RFID devices associated with a device (Block 332). The processor compares multiple unique identification numbers to at least one reference number that is historically associated with the device (Block 334). When any of the unique identification numbers favorably compare to the at least one reference number, then the processor verifies the identity of the user (Block 336). When any of the unique identification numbers unfavorably compares to the at least one reference number, then the processor declines to verify the identity of the user (Block 338). The processor sends a message that verifies, or denies, the identity of the user (Block 340).

Exemplary embodiments may be physically embodied on or in a computer-readable medium. This computer-readable medium may include CD-ROM, DVD, tape, cassette, floppy disk, memory card, and large-capacity disk (such as IOMEGA®, ZIP®, JAZZ®, and other large-capacity memory products (IOMEGA®, ZIP®, and JAZZ® are registered trademarks of Iomega Corporation, 1821 W. Iomega Way, Roy, Utah 84067, 801.332.1000, www.iomega.com). This computer-readable medium, or media, could be distributed to end-subscribers, licensees, and assignees. These types of computer-readable media, and other types not mention here but considered within the scope of the exemplary embodiments. A computer program product comprises processor-executable instructions for verifying identity.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

What is claimed is:

1. A method of verifying an identity of a person, comprising:
   receiving a request for verification from a device, the request for verification comprising a set of rules supplied by a requestor that determines how strictly the identity of the person is verified;
   retrieving a signature associated with the device;
   determining the signature is stale;
   acquiring multiple signatures from the device representing presences of multiple devices;
   comparing only the multiple signatures to a constellation of reference signatures historically received from the device according to the set of rules; and
   when the multiple signatures match the constellation of reference signatures, then verifying the identity of the person carrying the device.

2. The method according to claim 1, wherein comparing only the multiple signatures comprises comparing the multiple signatures to an historical signature.

3. The method according to claim 2, wherein when the multiple signatures match the historical signature, then verifying the identity of the person.

4. The method according to claim 1, further comprising declining to verify the identity of the person when the multiple signatures do not match the constellation of reference signatures.

5. The method according to claim 1, wherein acquiring the multiple signatures comprises acquiring transponder signals from multiple articles.

6. The method according to claim 1, further comprising querying for the constellation of reference signatures based on at least one of a date, a time, and a location.

7. The method according to claim 1, further comprising sending a verification message that verifies the identity of the person.

8. The method according to claim 1, further comprising permitting a percentage variation between the multiple signatures and the constellation of reference signatures.

9. The method according to claim 1, further comprising associating the constellation of reference signatures to a wireless phone.

10. The method according to claim 1, further comprising requiring presence of a signature in the multiple signatures to verify the identity of the person.

11. The method according to claim 1, wherein acquiring the multiple signatures comprises acquiring unique identification numbers that represent presences of multiple radio frequency identification devices, and
    wherein comparing the multiple signatures comprises comparing the unique identification numbers to at least one reference number historically associated with the constellation of reference signatures; and
    when the unique identification numbers match the at least one reference number, then verifying the identity of the person.

12. A system for verifying identity, comprising:
    a processor executing code stored in memory that causes the processor to:
    receive a request for verification from a device, the request for verification comprising a set of rules supplied by a requestor that specifies a membership set for a work day for verifying the identity of a single user;
    retrieve a signature associated with the device;
    determine the signature is stale;
    acquire a new set of identification numbers sent by the device that represent presences of multiple radio frequency identification devices;
    query a database of signatures that stores identification numbers that have been historically received from the device on the work day;
    retrieve an historical set of identification numbers that are historically associated with the device on the work day;
    match the new set of identification numbers to the historical set of identification numbers;
    verify the identity of the single user when the new set of identification numbers matches the historical set of identification numbers on the work day; and
    authorize a financial transaction using the identity of the single user carrying the device.

13. The system according to claim 12, wherein the code further causes the processor to retrieve a membership rule describing an identification number that must be present in the set of identification numbers.

14. The system according to claim 12, wherein when the set of identification numbers does not match the historical set of identification numbers, then the code further causes the processor to decline to authorize the transaction.

15. The system according to claim 12, wherein the code further causes the processor to retrieve a membership rule describing multiple identification numbers that must be present in the set of identification numbers.

16. The system according to claim 12, wherein the code further causes the processor to retrieve a membership rule according to a location of the device.

17. A non-transitory computer readable medium storing computer-readable instructions for performing a method, the method comprising:
   receiving a request for verification from a device, the request for verification comprising a set of rules supplied by a requestor that specifies a membership set for a work day for verifying the identity of a single user;
   retrieving a signature associated with the device;
   determining the signature is stale;
   acquiring a new set of identification numbers sent by the device that represent presences of multiple radio frequency identification devices;
   querying a database of signatures that stores identification numbers that have been historically received from the device on the work day;
   retrieving an historical set of identification numbers associated with the device;
   comparing the set of identification numbers to the historical set of identification numbers;
   verifying the identify of the single user when the new set of identification numbers matches the historical set of identification numbers; and
   authorizing a financial transaction using the identity of the single user associated with the device.

18. The computer readable medium according to claim 17, further comprising instructions for retrieving a rule associated that specifies an identification number that must be present in the set of identification numbers.

19. The computer readable medium according to claim 17, further comprising instructions for when the new set of identification numbers do not match the historical set of identification numbers, then declining to authorize the financial transaction.

20. The computer readable medium according to claim 17, further comprising instructions for:
   receiving location coordinates; and
   requiring identification numbers in the set of identification numbers when the location coordinates match a work facility.

* * * * *